United States Patent [19]

Watanabe et al.

[11] 4,294,630
[45] Oct. 13, 1981

[54] METHOD AND APPARATUS FOR THE CONTINUOUS FURNACE BRAZING AND SOFT-NITRIDING TREATMENTS OF IRON ARTICLES

[75] Inventors: Teruoki Watanabe; Tadao Kanno; Akio Hidaka, all of Kawagoe; Shunji Kobayashi, Sayama, all of Japan

[73] Assignee: Honda Giken Kogyo Kabushiki Kaisha, Tokyo, Japan

[21] Appl. No.: 56,922

[22] Filed: Jul. 12, 1979

[30] Foreign Application Priority Data

Jul. 12, 1978 [JP] Japan .................................. 53-84680
Jul. 13, 1978 [JP] Japan .................................. 53-85384

[51] Int. Cl.³ .............................................. C21D 1/48
[52] U.S. Cl. .................................. 148/16.6; 148/127; 148/16.7
[58] Field of Search ........... 228/199, 219, 220, 263 C, 228/263 D; 148/16.6, 127, 16, 16.7, 20.3

[56] References Cited

U.S. PATENT DOCUMENTS

| | | | |
|---|---|---|---|
| 2,908,072 | 10/1959 | Johnson | 29/473.1 |
| 3,055,007 | 9/1962 | Bell | 1/44.5 |
| 3,557,423 | 1/1971 | Wolfe et al. | 148/127 |
| 3,615,920 | 10/1971 | Talento | 148/127 |
| 4,003,764 | 1/1977 | Wünning | 148/16.6 |
| 4,046,601 | 9/1977 | Hook | 148/16.6 |
| 4,145,235 | 3/1979 | Gondo et al. | 148/142 |

OTHER PUBLICATIONS

"Soft Nitriding Gives Hard Surface to Steel, Cast Iron", *Iron Age*, vol. 212, p. 33, Aug. 2, 1973.
*Metals Handbook*, 8th ed., vol. 6, p. 599.

*Primary Examiner*—L. Dewayne Rutledge
*Assistant Examiner*—John P. Sheehan
*Attorney, Agent, or Firm*—Irving M. Weiner; Pamela S. Burt; John L. Shortley

[57] ABSTRACT

A method for continuously treating an iron member wherein the iron member is first subjected to furnace-brazing in a controlled gas environment and subsequently to a soft-nitriding treatment by addition of ammonia gas ($NH_3$) to the controlled gas for the brazing. An apparatus for carrying out the method is also provided, and includes three partitioned chambers for brazing, annealing and soft-nitriding the iron member, each chamber being partitioned by a member such as a stainless steel film curtain at opposite sides thereof. A controlled gas feed system communicates with each of the chambers, and an ammonia gas feed system is connected to the soft-nitriding chamber.

12 Claims, 3 Drawing Figures

METHOD AND APPARATUS FOR THE CONTINUOUS FURNACE BRAZING AND SOFT-NITRIDING TREATMENTS OF IRON ARTICLES

BACKGROUND OF THE INVENTION

1. Field of the Invention

The present invention relates to a method and apparatus for the continuous treatments of iron members or parts wherein a furnace brazing procedure and a gas soft-nitriding procedure are combined such that the iron article is successively treated by such combined procedures.

2. Description of Relevant Art

A furnace brazing technique is known as a method of soldering machine parts and is suitable for mass-producing soldered parts of stable and uniform quality. In such known furnace brazing method, a protecting controlled gas is introduced into the furnace to prevent the parts to be treated, as well as a brazing material, from being oxidized or decarbonized. The brazing material is heated to a temperature higher than its melting point to conduct the brazing treatment. Such controlled gases include, for example, endothermic gases (RX gases), exothermic gases (NX and DX gases), and the like. The brazing temperature varies depending on the type of brazing material, e.g., it is generally in the range of 1090° C. to 1150° C. for brazing copper, and 910° C. to 980° C. for brazing silver. Illustrative of known brazing techniques are those disclosed in U.S. Pat. No. 2,908,072 entitled "BRAZING PASTE AND PROCESS OF BRAZING" and U.S. Pat. No. 3,055,097 entitled "METHOD OF MAKING A REINFORCED BRAZED TUBULAR JOINT".

In order to improve fatigue and wear resistance of iron members, there have been proposed and practiced gas soft-nitriding methods wherein an iron member is treated to form a hard nitriding layer on the surface portion thereof. As is well known, the gas soft-nitriding method employs a mixed gas of a carrier gas such as the above-mentioned endothermic gas (RX gas) or exothermic gas (NX gas), to which is added ammonia gas (NH$_3$), and the gas soft-nitriding treatment is carried out at 550°–620° C. in such atmosphere. By such treatment, the iron member is provided in the surface portion thereof with a crystalline layer called an "ε phase", composed of iron, nitrogen and carbon (Fe-N-C), serving to enhance fatigue and wear resistance, as well as to enhance the mechanical strength of the member.

Such brazing and gas soft-nitriding treatments have heretofore been conducted separately for soldering metal parts by the brazing and for improving the mechanical strength of the parts by the gas soft-nitriding treatment. It is common practice that when improved mechanical strength is necessary, the brazing treatment is first conducted as required and then the brazed parts are subjected to the gas soft-nitriding treatment in a separate step or line, such as disclosed at page 599 (Example 545) of the *Metals Handbook*, 8th Edition, Volume 6 entitled "Welding and Brazing" (by the American Society for Metals). Thus, according to known treating procedures, parts of lowcarbon steel or other steels of low quality are first brazed and then the brazed parts must be subjected to a gas soft-nitriding treatment or other treatments, when it is required to improve the mechanical strength thereof, whereupon the brazed parts are again heated and treated in a completely separate apparatus, step, or line.

In such known methods, when the successive procedures of brazing and gas soft-nitriding treatments are required, there arises a number of problems. For example, an increased number of steps and additional equipment are required, poor treating and working efficiency results because the treatments are effected in separate lines, the cost of equipment is increased, additional work is required because of the separation in procedures, and additional space for installation of lines is also required. Such attendant problems render the methods unfavorable for mass-production of parts which are to be brazed and subsequently gas soft-nitrided, inevitably resulting in an increased cost of the final products. In addition, the known separate procedures are not favorable due to a loss of heat energy because separate heating treatments are required for the brazing and gas soft-nitriding procedures, respectively. Further, the re-heating of brazed parts may undesirably involve thermal stress of the product, thus lowering the quality of the product, and leading to a lowering of yield of the product.

The present invention effectively solves the above-discussed problems encountered in the known methods wherein the brazing and gas soft-nitriding procedures are carried out separately. In the present invention, the brazing procedure is conducted under heating conditions wherein heat energy is able to be used for subsequent treatments, and the controlled gas for the brazing has substantially the same standard composition as a carrier gas for the gas soft-nitriding treatment.

SUMMARY OF THE INVENTION

The present invention provides a method for the continuous furnace brazing and gas soft-nitriding treatments of iron parts or members. The method comprises steps of subjecting the iron member to a furnace brazing treatment in a controlled gas for brazing, furnace-cooling the brazed member to a temperature suitable for a subsequent gas soft-nitriding treatment, and adding a predetermined amount of ammonia gas (NH$_3$) to the controlled gas to conduct the gas soft-nitriding treatment of the member in the resulting atmosphere. More particularly, the method comprises heating an iron member for brazing in a heating zone in an atmosphere of a controlled gas, passing the brazed member to a furnace cooling zone where the member is slowly cooled in an atmosphere of the controlled gas of the same composition as previously employed, further passing the cooled member to a constant-temperature zone which is held at a gas soft-nitriding treatment temperature and which is in an atmosphere of the same type of controlled gas as previously employed and to which has been added ammonia gas (NH$_3$) in an amount required for the gas soft-nitriding treatment, conducting the gas soft-nitriding treatment of the member for a sufficient time in the constant-temperature zone, and withdrawing the treated member.

According to another feature of the invention, there is provided an apparatus for carrying out the above-described method. The apparatus comprises a brazing furnace which is partitioned into a heating chamber for heating the iron member to brazing temperatures, an annealing chamber for furnace cooling the brazed member, and a constant-temperature chamber which is held at a gas soft-nitriding temperature. These chambers are arranged to communicate with one another, a controlled gas feed system extends to each of the chambers to feed a controlled gas into each chamber, and an ammonia gas feed system is provided for feeding an ammonia gas into the constant-temperature chamber. The apparatus further includes partition means such as heat-resisting film curtains provided at opposite sides of each chamber to inhibit free communication between the respective chambers and between the outside chambers and the atmosphere.

An object of the invention is to provide a continuous furnace brazing and gas soft-nitriding method which overcomes the disadvantages and shortcomings of the conventional and prior art methods.

Another object of the invention is to provide a continuous treating method for iron articles or members in which an iron article is continuously subjected to a furnace brazing and a gas soft-nitriding treatment such that the operations and steps for both treatments can be improved to a significant extent with improved operational efficiency and productivity and also with efficient elimination of equipment and an efficient arrangement of operation lines. The invention thus provides efficient mass production and a reduction in cost of the articles being treated by the brazing and gas soft-nitriding procedures in combination.

A further object of the invention is to provide a treating method wherein the brazing and gas soft-nitriding procedures are conducted continuously in a heated furnace, whereby the heat energy is utilized efficiently, energy is saved, and the two treatments are effected with a minimal consumption of heat energy.

Another object of the invention is to provide a treating method wherein because an article obtained after the brazing and cooling steps need not be re-heated for subsequent gas soft-nitriding treatment, the final product is free of thermal stress or other physical deformations and is thus excellent and uniform in quality.

A still further object of the invention is to provide an apparatus for carrying out the above-described method.

The above and other objects, features and advantages of the present invention will become apparent from the following detailed description, when read in conjunction with the accompanying drawings.

DETAILED DESCRIPTION OF PREFERRED EMBODIMENTS

Figure 1:
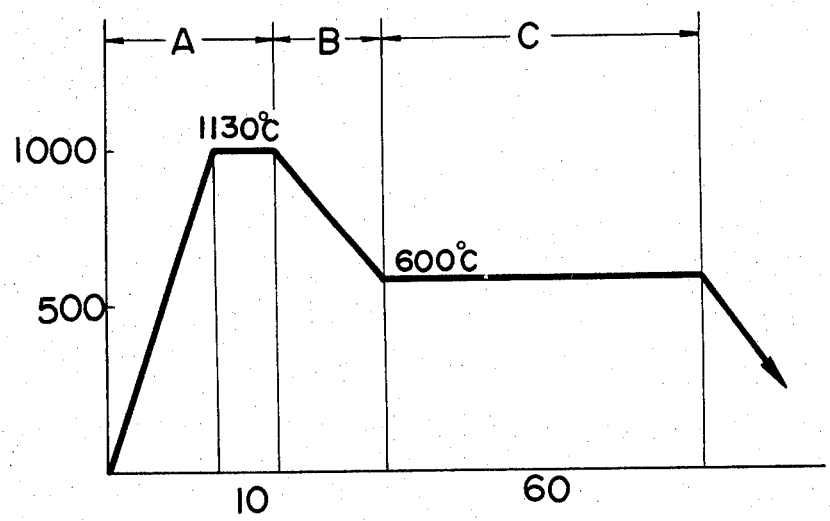
FIG. 1 is a first graph illustrating the method of the invention.

In practicing the present invention, iron parts or members are first passed into a brazing furnace to effect the brazing. The member in the furnace is heated for brazing in a protecting controlled gas having substantially the same standard composition as a carrier gas employed for a gas soft-nitriding treatment treatment. For the protecting controlled gas, there is employed an endothermic gas (RX gas) or an exothermic gas ($CO_2$-removed NX gas or DX gas obtained by cooling and drying a completely burnt gas) which is readily employed as a treating gas for the gas soft-nitriding treatment by the addition of ammonia gas ($NH_3$) thereto. The member to be brazed is kept at a brazing temperature for a predetermined time, while the member is prevented from being oxidized and decarbonized in such protecting controlled gas. The brazing temperature varies depending on the type of a brazing metal and is, as indicated hereinabove, 1090° C.–1150° C. in the case of brazing copper, 910° C.–980° C. for brass, and 700° C.–900° C. for brazing silver.

After brazing, the brazed member is transferred to an annealing zone in the furnace where it is forcibly cooled to a temperature at which a subsequent gas soft-nitriding treatment is conducted. After cooling to the predetermined temperature, the member to be further treated is passed into a constant-temperature zone provided within the furnace where it is held at a temperature required for the gas soft-nitriding treatment. Ammonia gas ($NH_3$) has been previously introduced into the constant-temperature zone. Because the protecting controlled gas for the brazing has little or no difference in basic composition from the gas for the gas soft-nitriding treatment, the controlled gas is readily employed as a mixed gas for the gas soft-nitriding treatment by merely introducing ammonia gas. The brazed member is kept in the constant temperature zone for a predetermined time to permit a soft-nitrided layer to be formed in its surface portion. After completion of the gas soft-nitriding treatment, the member is withdrawn and permitted to cool.

As described above, the endothermic or exothermic gas is employed so as to prevent oxidation and decarbonization of the iron member upon brazing and has, for example, the following composition:

Composition of Exothermic Gas (NX gas) by volume:

| CO | 1.8% |
|---|---|
| $H_2$ | 0.9% |
| $CO_2$ | 0.05% |
| $N_2$ | balance. |

Composition of Endothermic Gas (RX gas) by volume:

| CO | 24.5% |
|---|---|
| $H_2$ | 31.2% |
| $CO_2$ | 0.26% |
| $N_2$ | balance. |

The furnace brazing is conducted in the protecting controlled gas of one of the above set forth compositions. The controlled gas, to which ammonia gas ($NH_3$) is added, is useful as a mixed gas for the gas soft-nitriding treatment.

The gas normally employed for the gas soft-nitriding treatment consists, on a volume basis, of 80% exothermic gas and 20% ammonia gas ($NH_3$); or 50% endothermic gas and 50% ammonia gas ($NH_3$). Accordingly, ammonia gas is added to the controlled gas in a predetermined amount by volume which depends on the type of controlled gas employed as indicated above, and thereafter the gas soft-nitriding treatment is conducted in such atmosphere of mixed gas.

As described hereinabove, the brazing and gas soft-nitriding treatments are effected continuously.

Sheet metal parts composed of an ordinary cold rolled steel (SPCC prescribed in Japanese Industrial Standard with a composition of below 0.12% C, below 0.50% Mn, below 0.4% P, below 0.045% S and the balance Fe) are jointed and caulked, and a copper (Cu) ring is applied to the joint portion as a brazing material.

The parts are then transferred to a furnace by means of a mesh belt carrier system in accordance with the invention. Thereafter, the brazing treatment is conducted in a heating zone in the furnace, in a brazing atmosphere of the afore-mentioned endothermic gas or exothermic gas, at approximately 1130° C. for ten minutes. The thus brazed parts are passed into an annealing zone in the furnace where the parts are forcibly cooled, such as by a fan, to 650° C.–600° C. The cooled parts are then passed into a constant-temperature zone in the furnace which is held at substantially the same temperature as in the preceding zone and where the gas is ammonia ($NH_3$)-enriched, and are maintained in the constant-temperature zone for approximately sixty minutes to effect the soft-nitriding treatment. Thereafter, the atmospheric gas is diffused by a fan to accelerate the soft-nitriding treatment. Upon initiation of the treatment, the content of ammonia gas in the atmosphere is 20% and the residual $NH_3$ after the soft-nitriding treatment is normally in the range of 8.5% to 10%. After the soft-nitriding treatment, the treated parts are removed from the furnace and permitted to cool.

By such treatment, the parts are formed with a 15μ thick nitride layer and a 0.3 mm thick diffusion layer, and have a surface hardness (HMV) of 550 to 700.

FIG. 1 is a graph illustrating the procedures of the foregoing example according to the invention in which the treating time (minutes) is taken as the abscissa and the furnace treating temperatures as the ordinate. The sections A, B and C refer to the heating zone, annealing zone, and constant-temperature zone, respectively.

Figure 2:
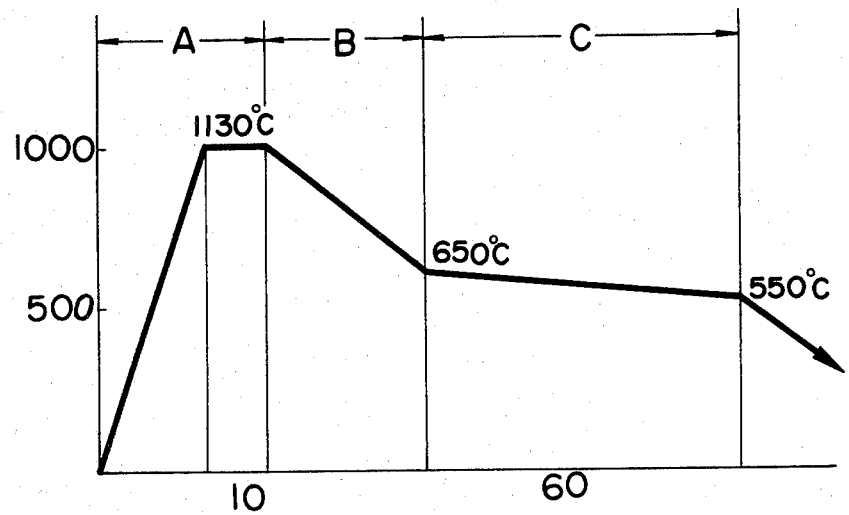
FIG. 2 is a second graph depicting the inventive method.

Similarly favorable results are obtained when the soft-nitriding treatment is conducted with slow cooling from 650° C. to 550° C. as shown in FIG. 2.

Although the parts are treated in the foregoing procedure through the three heating, annealing and constant-temperature zones, the treatment may be continuously effected in one zone wherein the temperature is changed to correspond to those of the abovedescribed three zones as the procedure progresses, and in which ammonia gas is added at the constant-temperature stage.

The specific formulation of the treating gas as described hereinbelow will permit a substratum treatment for painting of parts to be treated as well as the soft-nitriding treatment.

When the nitride layer, which has been formed by the gas soft-nitriding treatment conducted subsequent to the furnace brazing, is substantially composed of an $\epsilon$ phase in the surface portion thereof and preferably has a thickness of above 15μ, it serves very conveniently as a substratum for painting. This is due to the fact that the fats and oils normally deposited on the surface are completely burnt by the brazing and gas soft-nitriding treatments and thus the surface is cleaned, that the parts treated by the gas soft-nitriding treatment become rough on their surface, and that the nitride layer composed primarily of the $\epsilon$ phase displays a good corrosion preventive property. Accordingly, such nitride layer is utilized as a substratum for painting as is, and can be applied with paint directly on the surface thereof. If, however, an excess of carbon monoxide (CO) is contained in the controlled gas, carbon tends to be deposited on the surface of the treated parts and must be removed after treatment. To avoid same, the gas should have a CO content of below 10%, preferably below 4.5% of the total components of the gas, by which deposition of carbon on the surface of the parts is avoided.

A preferable example of such gas composition useful for the substratum treatment for painting is as follows:

| | |
|---|---|
| Ammonia gas ($NH_3$) | 10%–30% by volume |
| Carbon monoxide (CO) | 1%–3% |
| Exothermic gas | balance. |

The use of the gas of the above formulation will avoid generation of free carbon in the gas soft-nitriding step and deposition of carbon on the surface of the treated parts. The CO content is defined in the range of 1% to 3% in the above formulation because the exothermic gas contains CO, and the total CO content is sufficiently in the range of 2.5% to 4.5% by volume of the gas soft-nitriding treatment gas. It should be noted that a CO content lower than 2.5% is unfavorable because the mechanical strength and wear resistance of the nitride layer obtained by such gas treatment is not satisfactory.

As described, the furnace brazing is conducted in an atmosphere of an exothermic gas, to which is then added 10% to 30% by volume of ammonia gas ($NH_3$) and 1% to 3% by volume of carbon monoxide (CO) to conduct a gas soft-nitriding treatment so as to thereby form a nitride layer, preferably in a thickness of 15μ, composed primarily of an $\epsilon$ phase in the surface portion of the treated parts. A thickness smaller than 15μ is unfavorable because the film strength becomes relatively low, and thus a thickness of 15μ or more is preferable. The nitride layer should preferably be the $\epsilon$ phase since $\gamma'$ or other phase layers are poor in corrosion preventive ability. An $\epsilon$ phase layer with a thickness of below 15μ or a layer in a mixed form of the $\epsilon$ phase and $\gamma'$ phase may be used, depending on the intended use of the treated parts, and also on the film thickness.

During the course of the gas soft-nitriding treatment treatment using a controlled gas of the above-discussed specific type, the parts, which have been continuously furnace-brazed and gas soft-nitrided, also undergo a paint-substratum treatment. Accordingly, the treated parts can be immediately passed to a painting step for a subsequent painting treatment. Thus, according to the invention, the furnace-brazing, gas soft-nitriding, and paint-substratum treatments are continuously effected by a dry system without any chemical pretreatment for painting as required in conventional or prior art methods. Further, it is possible to continuously paint the thus treated parts in a subsequent step at a predetermined temperature.

Figure 3:
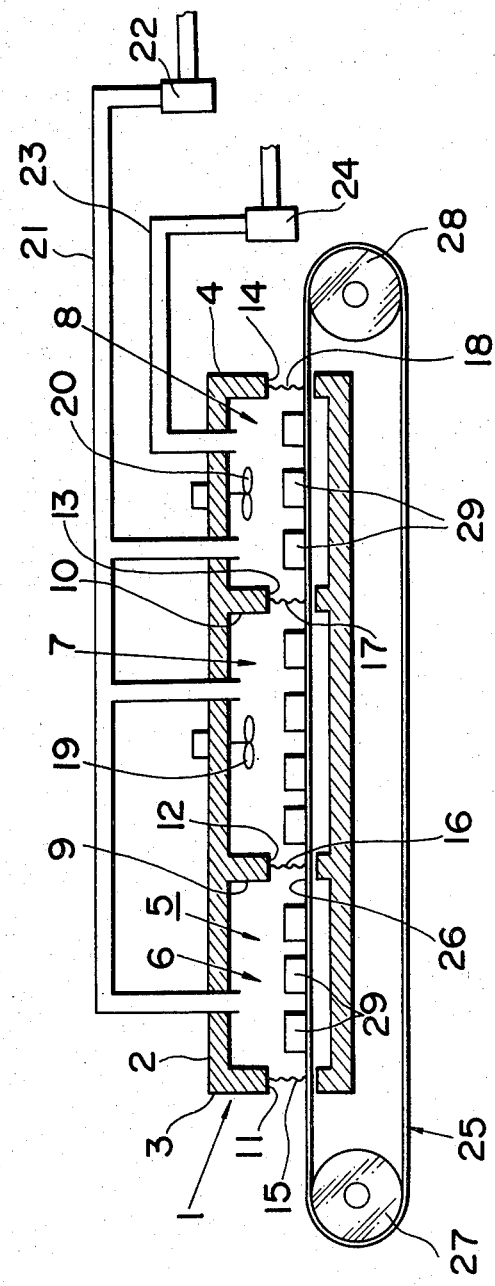
FIG. 3 is a schematic view showing one embodiment of an apparatus according to the invention.

With reference to FIG. 3, there is shown a schematic view of an apparatus for carrying out the continuous treatments described above. A furnace 1 comprises a treating apparatus, which includes a furnace body 2 having a predetermined length. The furnace body 2 includes therein a chamber 5 extending along its entire length and defined by furnace walls 3 and 4 at the front and rear sides thereof. The walls 3 and 4 are each provided with an opening to permit communication with the ambient air. The openings at the left and right sides as viewed in FIG. 3 serve as an inlet port 11 for parts to be treated and an outlet or discharge port 14, respectively.

Chamber 5 in furnace body 2 is partitioned by means of partition walls 9 and 10 to define a front chamber 6, an intermediate chamber 7, and a rear chamber 8. The wall 9 interposed between front chamber 6 and intermediate chamber 7 is provided with an opening 12 to permit communication therebetween. Similarly, the wall 10 interposed between intermediate chamber 7 and rear chamber 8 is provided with an opening 13 to permit communication therebetween. A mesh-type belt conveyor 25 is provided along furnace body 2 in such a manner that an upper conveying portion 26 of conveyor 25 passes along the floor portions of chambers 6, 7 and 8 through the inlet port 11, openings 12, 13 and outlet port 14 to form a moving floor. The conveyor 25 is driven by a driving wheel 27 and a driven wheel 28 which are provided at the outer front and rear sides of furnace 1, respectively. The openings 11, 12, 13 and 14 are closed with shielding means such as stainless steel corniced film curtains 15, 16, 17 and 18, respectively. The respective curtains are drooped from the upper portions of the openings and the lower ends thereof slidably contact the upper surface of conveying portion 26. Parts to be treated are fed from chamber to chamber while pushing away the curtains. Thus, the ambient air, front chamber 6, intermediate chamber 7, and rear chamber 8 are partitioned from one another, permitting use of different internal temperatures and different types of atmospheric gas in the respective chambers.

The chambers 6, 7 and 8 of furnace body 2 are connected with a pipe 21 through branched pipes. A protecting atmospheric gas used to prevent the parts to be treated and a brazing material from being oxidized or decarbonized is charged through pipe 21 into chambers 6, 7 and 8. A flow meter 22 and the pipe 21 are connected to a gas feed source (not shown). The gas is one which is suitably selected from the above set forth gases. The rear chamber 8 is connected to a separate pipe 23, which is in turn connected to a gas feed source (not shown) through a flow meter 24, by which ammonia gas ($NH_3$), required for the gas soft-nitriding treatment, is charged through pipe 23. As a result, ammonia gas is admixed with the protecting gas which has already been introduced into chamber 8 from pipe 21 and thus chamber 8 is held in an atmosphere suitable for the gas soft-nitriding treatment by means of the mixed gas.

A cooling fan 19 is provided at the ceiling of intermediate chamber 7 and an agitating fan 20 is similarly provided at the ceiling of rear chamber 8.

The partitioned chambers 6, 7 and 8 of chamber 5 of the furnace 1 are employed for use as follows. Front chamber 6, which is disposed near inlet port 11, is employed as a heating chamber which is held at a temperature required for brazing parts to be treated and in which the parts are brazed. The intermediate chamber 7 comprises an annealing chamber in which the brazed parts are cooled to a suitable temperature for the subsequent gas soft-nitriding treatment. Rear chamber 8 is a constant-temperature chamber which is maintained at a suitable temperature for the gas soft-nitriding treatment. As described hereinabove, the temperature of heating chamber 6 depends on the type of brazing material employed.

In operation, iron parts 29 which are to be brazed and then gas soft-nitrided are placed on conveyor 25 and fed from inlet port 11 to heating chamber 6, in which the parts 29 are heated to a brazing temperature and brazed. Because this treatment is conducted under the above-described controlled gas conditions, the iron parts are prevented from being oxidized or decarbonized.

After the brazing treatment, the brazed parts are passed to the next annealing chamber 7 by means of conveyor 25, in which chamber 7 they are cooled to a temperature for the subsequent gas soft-nitriding treatment. Chamber 7 is in an atmosphere of the same gas composition as chamber 6, so that the parts being treated are protected. After being cooled to a predetermined temperature, the parts are further passed to the constant-temperature chamber 8 by conveyor 25.

In constant-temperature chamber 8, the parts are maintained at a temperature for the gas soft-nitriding treatment and undergo the soft-nitriding treatment with ammonia gas which has been added to the atmosphere of the same gas composition as employed above. After being treated for a predetermined time, the parts are withdrawn from outlet port 14 and are permitted to cool.

In the foregoing manner, the furnace brazing and gas soft-nitriding treatments are continuously effected in one surface and the parts obtained have undergone both treatments substantially at the same time.

As will be understood from the foregoing, in accordance with the invention the brazing and gas soft-nitriding treatments are continuously carried out in one furnace without the use of two separate steps and operations and separate equipment and lines as required in prior art techniques. Accordingly, the present invention provides a number of advantages, such as reduction of operation steps, improvement in operation efficiency, reduction of equipment costs, improvement in productivity of articles or parts which are required to be both brazed and gas soft-nitrided, reduction of energy consumption, efficient use of equipment, and reduction of cost for brazing and gas soft-nitriding treatments.

Because parts to be treated are heated only once during the course of the continuous treatments after which they are merely slowly cooled and kept at predetermined temperatures, the present invention is also advantageous over prior art methods with regard to heat energy consumption, resulting in a saving of heat energy and natural resources. Further, the final products suffer little thermal stress because they are not re-heated, and are uniform and excellent in quality. In addition, suitable selection of the treating gas provides a paint substratum treatment of the articles which eliminates any need for a normally-required chemical pre-treatment for a subsequent painting.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A method for the continuous furnace brazing and gas soft-nitriding treatments of an iron member, comprising the steps of:

subjecting the iron member to a furnace brazing treatment in a controlled gas for brazing:

furnace-cooling the brazed member only sufficiently to attain a temperature suitable for a subsequent gas soft-nitriding treatment, such that sufficient heat energy is retained from said brazing treatment without re-heating said member for said gas soft-nitriding treatment; and adding a predetermined amount of ammonia gas to said controlled gas to conduct said gas soft-nitriding treatment of said member in the resulting atmosphere.

2. A method according to claim 1, wherein:
said controlled gas for brazing has substantially the same standard composition as a mixed gas for said gas soft-nitriding treatment, except that said controlled gas for brazing does not include said ammonia gas.

3. A method according to claim 1, wherein:
said controlled gas for brazing comprises a gas selected from exothermic gases and endothermic gases.

4. A method according to claim 3, wherein:
said controlled gas comprises an exothermic gas comprising, on a volume basis, 1.8% CO, 0.9% $H_2$, 0.05% $CO_2$, and the balance $N_2$.

5. A method according to claim 3, wherein:
said controlled gas comprises an endothermic gas comprising, on a volume basis, 24.5% CO, 31.2% $H_2$, 0.26% $CO_2$, and the balance $N_2$.

6. A method according to claim 1, wherein:
said ammonia gas is used in an amount of 20% by volume of the total mixed gas when said controlled gas comprises an exothermic gas.

7. A method according to claim 1, wherein:
said ammonia gas is used in an amount of 50% by volume of the total mixed gas when said controlled gas comprises an endothermic gas.

8. A method according to claim 1, wherein:
said gas soft-nitriding treatment is conducted in an atmosphere of a mixed gas which comprises, on a volume basis, 10% to 30% ammonia gas, 1% to 3% carbon monoxide, and a balance of an exothermic gas, the total content of carbon monoxide in said mixed gas being in the range of 2.5% to 4.5% whereby a nitride layer comprised primarily of an $\epsilon$ phase is formed in the surface portion of said iron member.

9. A method according to claim 8, wherein:
said nitride layer is in a thickness greater than $15\mu$.

10. A method for the continuous furnace brazing and gas soft-nitriding treatments of an iron member, comprising the steps of:
brazing the iron member by heating said iron member in a heating zone in a furnace having an atmosphere of a controlled gas;
passing the brazed member to a furnace-cooling zone where said member is slowly cooled in an atmosphere of said controlled gas only sufficiently to attain a temperature suitable for a subsequent gas soft-nitriding treatment, such that sufficient heat energy is retained from said brazing treatment without re-heating said member for said gas soft-nitriding treatment;
further passing the cooled member to a constant-temperature zone in said furnace which is held at a gas soft-nitriding treatment temperature and which has an atmosphere of said controlled gas having ammonia gas added in an amount required for a gas soft-nitriding treatment;
conducting said gas soft-nitriding treatment of said member for a sufficient time in said constant-temperature zone; and
withdrawing the treated member.

11. A method according to claim 1, wherein:
said brazed member is furnace-cooled to a temperature within the range of 550° to 650° C. for said subsequent gas soft-nitriding treatment.

12. A method according to claim 10, wherein:
said brazed member is slowly cooled in said furnace-cooling zone to a temperature within the range of 550° to 650° C., and said gas soft-nitriding treatment temperature in said constant-temperature zone is within said temperature range.

* * * * *